United States Patent [19]
Yamashita et al.

[11] Patent Number: 4,877,121
[45] Date of Patent: Oct. 31, 1989

[54] VERTICAL EXCURSION ACCOMMODATION APPARATUS

[75] Inventors: Yoshikazu Yamashita; Toshiharu Ikenaga, both of Yokohama, Japan

[73] Assignee: Okamura Corporation, Japan

[21] Appl. No.: 110,687

[22] Filed: Oct. 20, 1987

[30] Foreign Application Priority Data

Oct. 30, 1986 [JP] Japan .................................. 61-256955
Mar. 31, 1987 [JP] Japan .................................. 62-78769

[51] Int. Cl.$^4$ .......................................... B65G 17/18
[52] U.S. Cl. .............................. 198/475.1; 198/476.1; 198/799; 198/800; 198/801
[58] Field of Search ...................... 198/475.1, 793, 797, 198/799, 800, 801, 476.1; 221/131; 187/16

[56] References Cited

U.S. PATENT DOCUMENTS

| | | | |
|---|---|---|---|
| 1,934,503 | 11/1933 | James et al. | 187/16 |
| 3,162,299 | 12/1964 | Wullschleger | 198/800 X |
| 3,194,432 | 7/1965 | Breitenstein et al. | 221/131 X |
| 3,760,934 | 9/1973 | Olson | 198/800 |
| 4,643,495 | 2/1987 | Pepping et al. | 198/800 X |

FOREIGN PATENT DOCUMENTS 53-37792 10/1978 Japan .

Primary Examiner—David A. Bucci
Assistant Examiner—Lyle Kimms
Attorney, Agent, or Firm—Poms, Smith Lande & Rose

[57] ABSTRACT

A vertical excursion accommodation apparatus is disclosed, which comprises a plurality of excursion shelf units disposed side by side and a control device for driving the excursion shelf units independently. Each of the excursion shelf units includes an endless chain passed round sprockets mounted on pair, i.e., upper and lower, parallel horizontal shafts and a plurality of trays each supported in a horizontal state by a support arm consisting of a pair of links having a stem pivoted to the endless chain. The trays are run around the horizontal shafts along an oval orbit by rotating the sprockets.

3 Claims, 9 Drawing Sheets

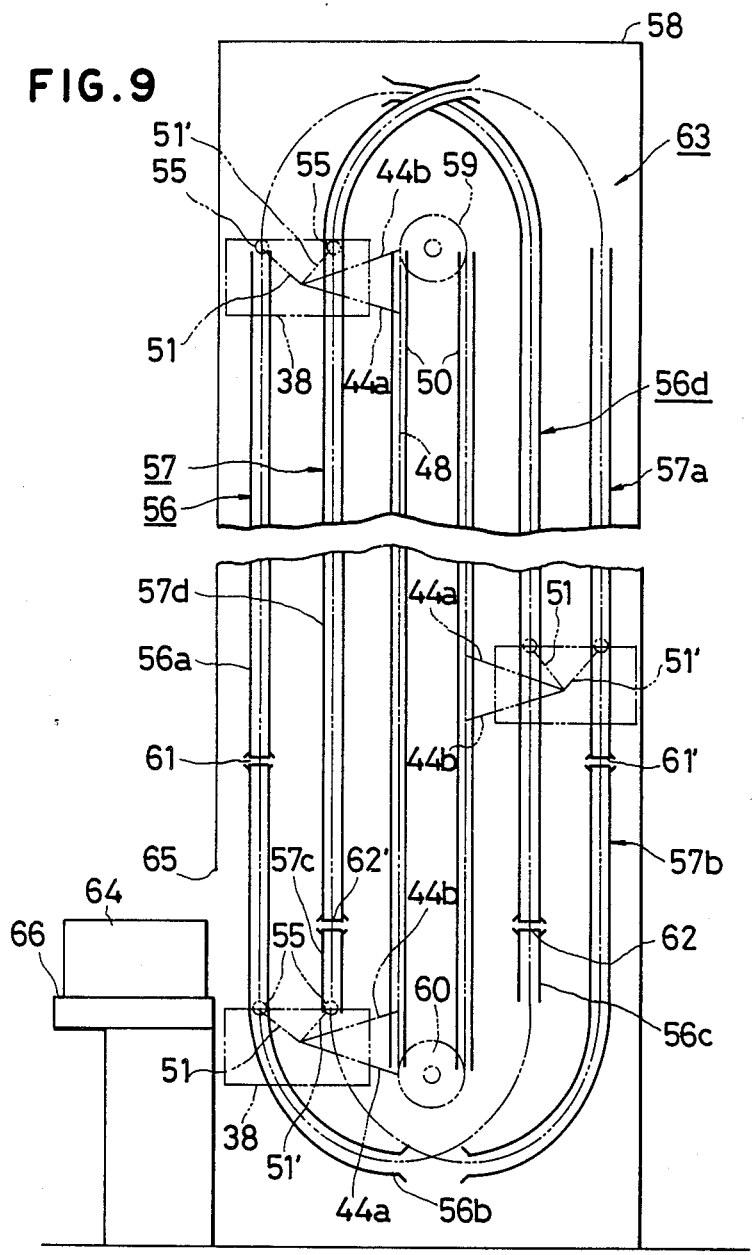

VERTICAL EXCURSION ACCOMMODATION APPARATUS

BACKGROUND OF THE INVENTION

1. Field of the Invention

This invention relates to vertical excursion accommodation apparatus, in which a plurality of rotary shelves are run about horizontal axes along an oval orbit.

2. Prior Art

In a prior art vertical excursion accommodation apparatus, an endless chain is passed round sprockets provided on a pair of, i.e., upper and lower, horizontal shafts, a plurality of horizontal shelves are coupled to the endless chain, and the endless chain is run to cause excursion of the horizontal shelves about the horizontal shafts.

Such a vertical excursion accommodation apparatus is well known and disclosed in, for instance, Japanese Pat. Publication 53-37792. It is used for arranging and accommodating parts or documents in factories, warehouses and offices.

SUMMARY OF THE INVENTION

An object of the invention is to provide a vertical excursion accommodation apparatus, in which the stabilizing mechanism for holding trays horizontally is simplified in structure compared to the prior art mechanism.

According to the invention, there is provided a vertical excursion accommodation apparatus, which comprises a plurality of excursion shelf units arranged side by side and capable of being driven independently around horizontal shafts, and also which permits a speedy picking operation to be performed with low drive force such that the time until each tray reaches a take-out window is reduced to a fraction of the time in the prior art.

More particularly, according to the invention there is provided a vertical excursion accommodation apparatus, which comprises a plurality of excursion shelf units disposed side by side and control means for driving the excursion shelf units independently, each of the excursion shelf units including an endless chain passed round sprockets mounted on pair, i.e., upper and lower, parallel horizontal shafts and a plurality of trays each supported in a horizontal state by a support arm consisting of a pair of links having a stem pivoted to the endless chain, the trays being run around the horizontal shafts along an oval orbit by rotating the sprockets.

Since a desired excursion shelf unit can be selected by the control means, a desired tray can be brought to a desired height position.

Further, by selecting a tray for each excursion shelf unit, a plurality of desired trays can be simultaneously brought to a required height position.

BRIEF DESCRIPTION OF THE DRAWINGS

FIG. 9 is a schematic side view showing an orbit of running of a guide arm.

DETAILED DESCRIPTION OF THE PREFERRED EMBODIMENTS

Now, a first embodiment of the invention will be described in detail with reference to FIGS. 1 to 5.

Figure 1:
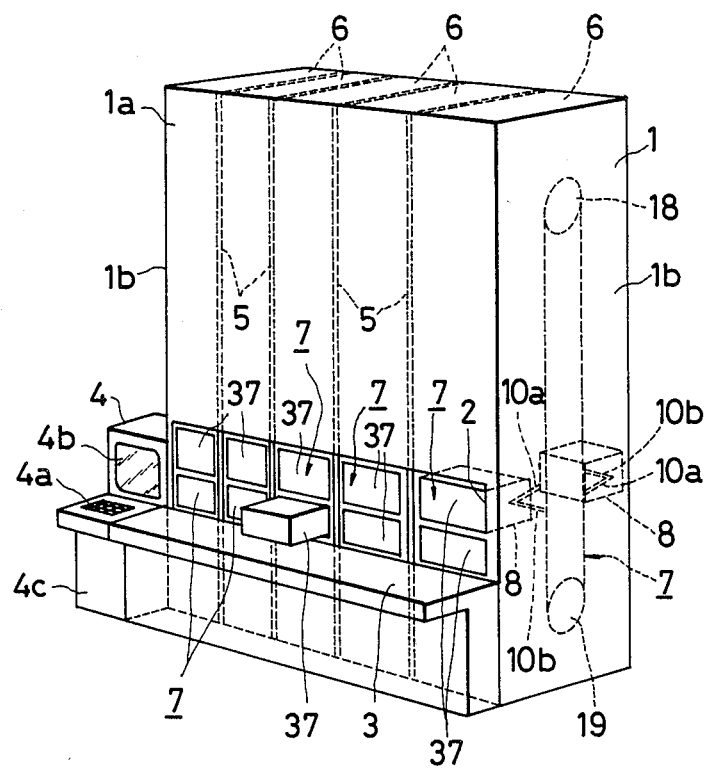
FIG. 1 is a perspective view showing a first embodiment of the invention.

In FIG. 1, reference numeral 1 designates a vertically elongate hollow case. A front wall 1a of the hollow case is provided in a lower portion with a taken-out window 2 which has such a width that it reaches opposite side walls 1b of the hollow case. A horizontal table 3 extends forwardly from the lower edge of the window 2.

Reference numeral 4 designates control means, e.g., an operating board, provided on the left side of the hollow case 1 and having an operating section 4a, e.g., a keyboard, and a display section 4b. A box or console 4c of the control means accommodates a computer or the like for controlling the operation of a motor or the like of the rotary accommodation apparatus to be described later.

The hollow case 1 is divided into a plurality of (i.e., five in this embodiment) sections 6 by vertical partition walls 5 directed forwards and backwards. Each section 6 accommodates a vertical rotary excursion shelf unit 7 as will be described later is provided in each section 6.

Figure 2:
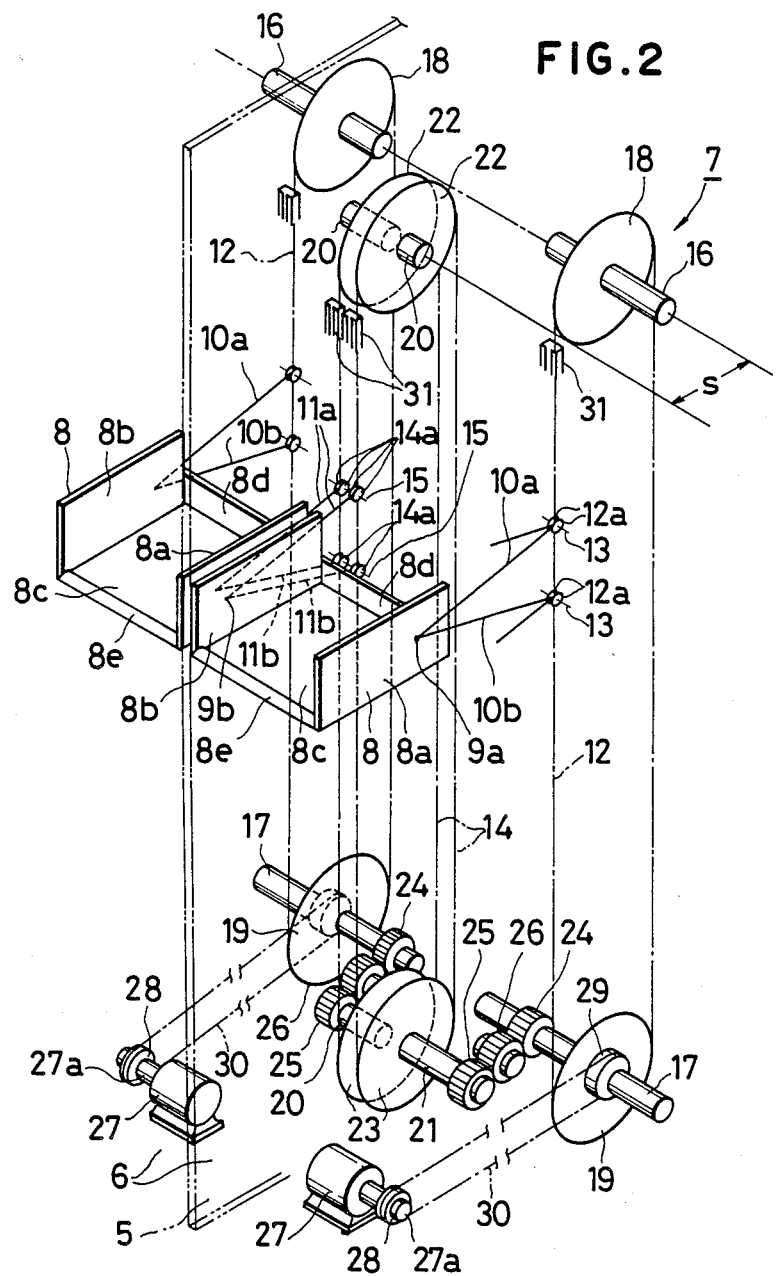
FIG. 2 is a schematic perspective view showing tray driving means.

Reference numeral 8 in FIG. 2 designates trays, each of which has a substantially channel-shaped front view defined by vertical right and left side walls 8a and 8b and a bottom 8c connecting the two side walls. The tray 8 also has a back wall 8d provided along the rear edge and having a reduced height. The front edge of the bottom 8c is provided with a hill-like ridge 8e for preventing the container from getting out of the tray 8.

The right side wall 8a of the tray 8 is provided on a rear portion of a horizontal central line with a pin 9a extending to the right. The left side wall 9b is provided at a position forwardly of the pin 9a by a length S with a pin 9b extending to the left.

These pins 9a and 9b support a right side first support arm 10 and a left side second support arm 11, respectively, such that front ends of these arms are pivoted in an overlapped fashion. The first and second support arms 10 and 11 are V-shaped sidewise and consist of a pair of links 10a and 10b and a pair of links 11a and 11b, respectively. The tray 8 is supported horizontally by the pair of support arms.

Figure 3:
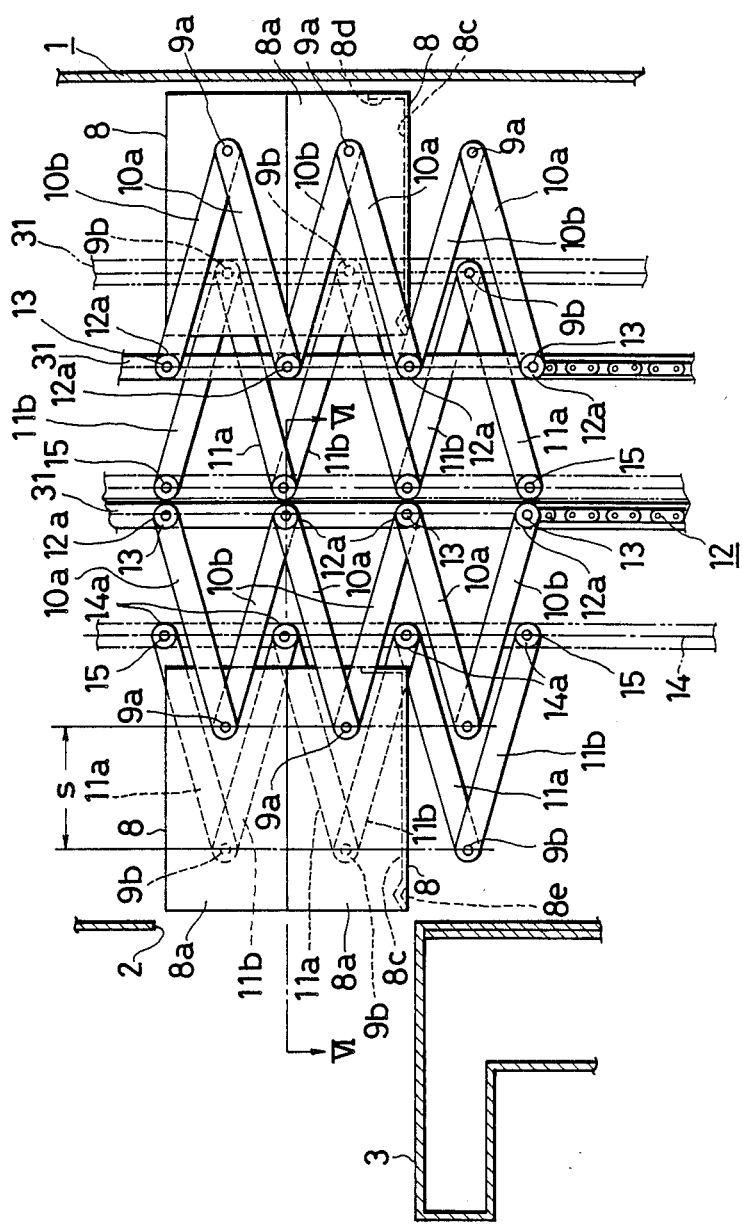
FIG. 3 is a side view showing support arms supporting trays.

As shown in FIG. 3, the stem or rear end of the first support arm 10 is pivotally coupled with a predetermined inter-link angle to mounting pins 13 which are provided at a predetermined interval on an endless chain 12 having side rollers 12a.

The link 10b of a first support arm 10 supporting a tray and the link 10a of the next lower first support arm 10 supporting the next lower tray 8 have their stems pivoted by the same mounting pin, and all the first support arms 10 extend endlessly and in a meandering fashion in a side view.

The stem of the left support arm 11, like the first support arm 10 noted above, is mounted with a predetermined inter-link angle to an endless chain 14 with side rollers 14a by mounting pins 15.

Reference numerals 16 and 17 in FIG. 2 designate pair, i.e., upper and lower, horizontal shafts extending transversally. The right side endless chain 12 with side rollers is passed round an upper driven sprocket 18 and a lower drive sprocket 19, these sprockets being mounted on the respective horizontal shafts 16 and 17 for rotation in unison therewith.

A left side endless chain 14 with side rollers is passed driven and drive sprockets 22 and 23 mounted on respective horizontal shafts 20 and 21 which are disposed in a forwardly staggered fashion by a length S with respect to the horizontal shafts 16 and 17.

The lower horizontal shafts 17 and 21 are coupled to each other in a synchronously rotatable fashion by gears 24 and 25 mounted on them and an intermediate gear 26 provided between these gears.

A drive sprockets 28 is mounted on an output shaft 27a of reversible motor 27 as drive means. An endless chain 30 is passed round this drive sprocket and a driven sprocket 29 secured to the horizontal shaft 17.

Figure 5:
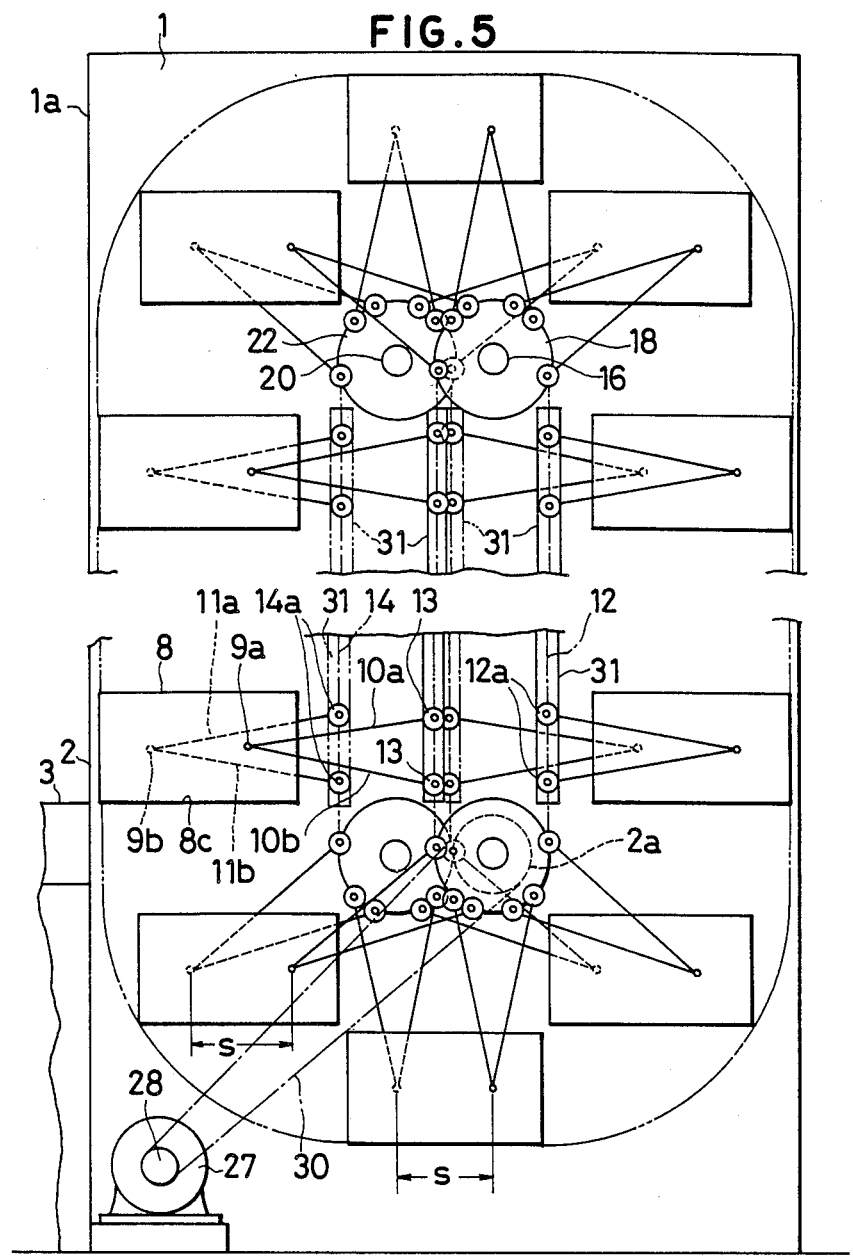
FIG. 5 is a schematic side view showing an orbit of running of a tray.
Figure 6:
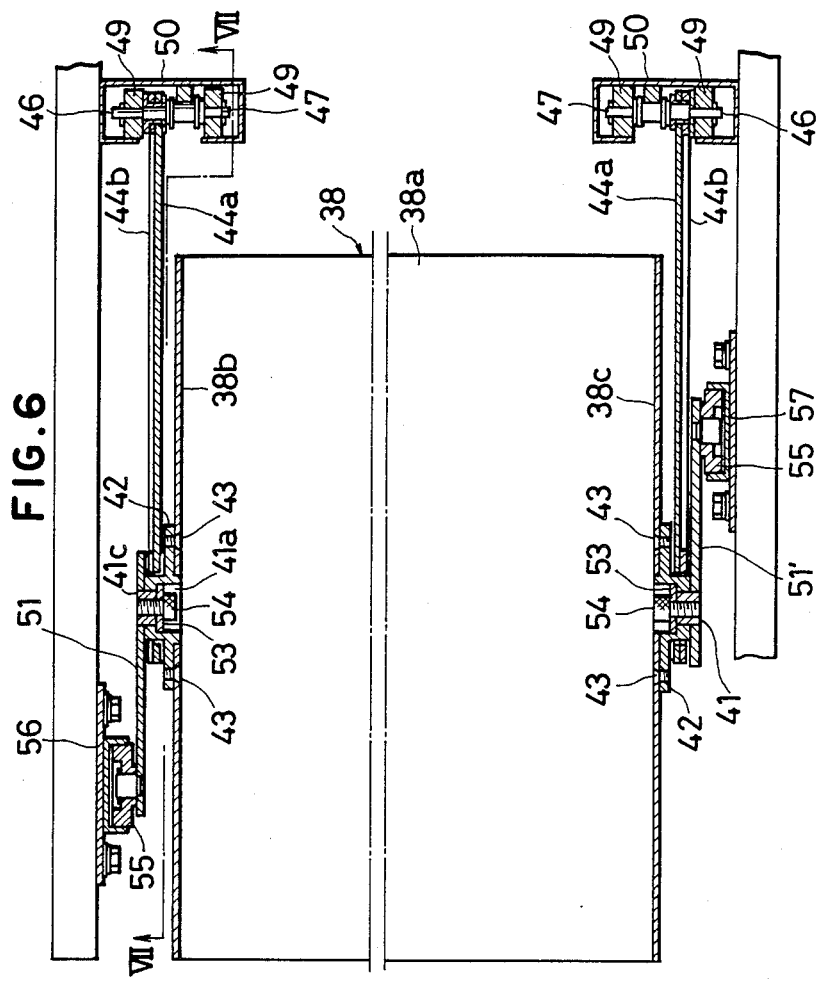
FIG. 6 is a sectional view showing a tray support structure in a second embodiment of the invention.

When the motor 27 is thus rotated forwardly or reversely, the right and left endless chains 12 and 14 with side rollers are run synchronously, and the trays 8 each supported by the chains 12 and 14 via the first and second support arms 10 and 11 are caused to undergo excursion along an oval orbit about the upper and lower horizontal shafts with their bottom 8c held horizontally at all time as shown in FIG. 5.

Figure 4:
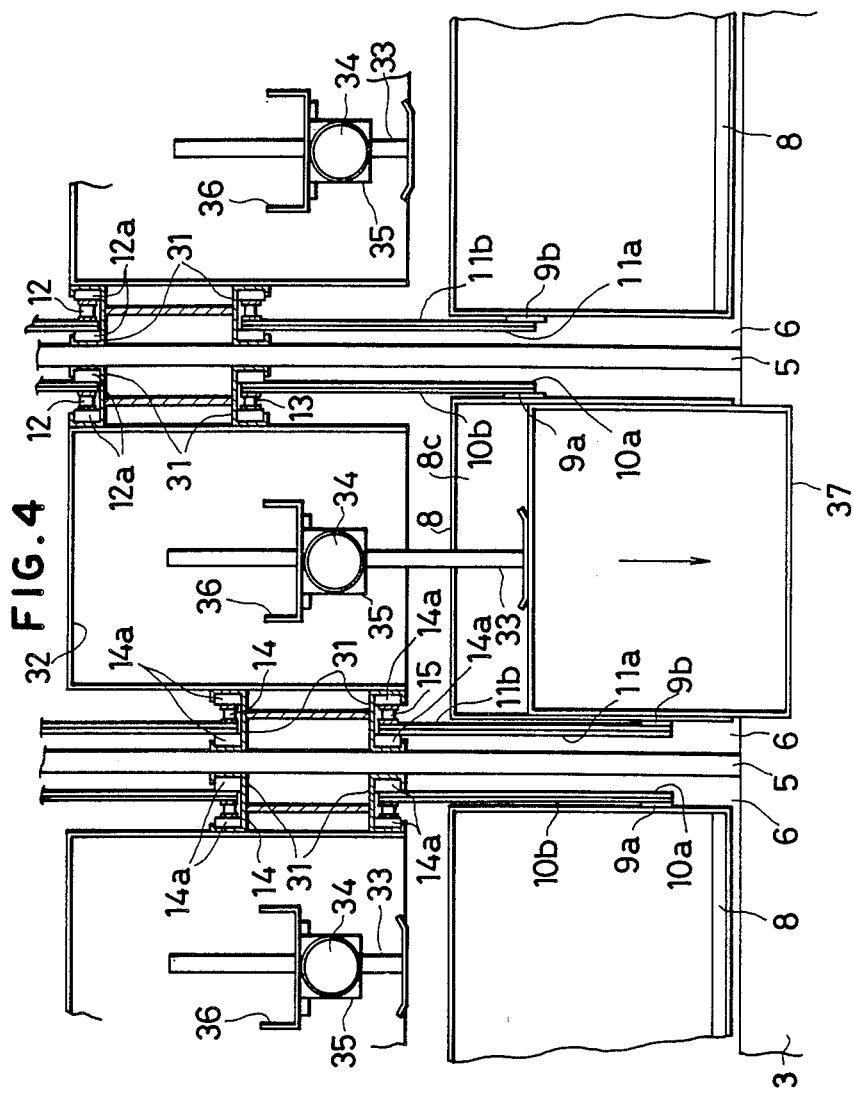
FIG. 4 is a sectional view taken along line VI—VI in FIG. 3.

As shown in FIG. 4, side rollers 12a and 14a provided on vertically intermediate runs of the left and right endless chains 12 and 14 with side rollers, are guided by guide rails 31 consisting of vertical channel-like members mounted as a front-and-back pair and a left-and-right pair on partition walls 5.

Between opposed surfaces of guide rails 31 are held left and right outer surfaces of a box 32 having an open front end directed toward the window 2.

A frame 36 extends upright from the bottom of the box 32. On the frame 36 is mounted a pusher having a push arm 33 which is reciprocable in the forward and rearward directions and a motor 34 as drive means.

Reference numeral 37 designates an accommodation container having a shape like a rectangular box open at the top. The container 37 is accommodated in the tray 8 such that it can be taken out and put into the tray. At its position facing the window 2, the tray 8 can be pushed out by the pusher 35 onto the table 3.

As shown in FIG. 2, two vertical excursion shelf units 7 which are adjacent to each other sidewise, are in plane symmetry arrangement with respect to a partition wall 5, so that the first and second support arms 10 and 11 of the adjacent trays 8 like arms are close to each other.

In the vertical excursion accommodation apparatus having the above structure, when data of a desired tray is input in the operating section 4a of the operating board 4, a motor 27 of vertical excursion shelf unit 7 having the desired tray 8 among the units 7 arranged sidewise, is rotated to drive the endless chains 12 and 14 with side rollers, the desired tray 8 is run about the horizontal shafts in an oval orbit, as shown in FIG. 5 and is stopped at a position in front of the window 2.

Then, the pusher 35 is operated, so that the container 37 in the tray 8 is pushed out onto the table 3 by the push arm 33.

After the part in the container 37 is taken out, the container 37 is returned to the tray 8.

When data about a plurality of trays 8 is input consequently instead of a single tray in the operating board 4, the individual vertical excursion shelf units 7 are driven independently, so that a plurality of containers 37 can be taken out at the same time.

In the first embodiment, the side walls of the tray are supported at two positions spaced apart in the forward and rearward directions by free ends of the first and second support arms consisting of pair links in a V-like sidewise arrangement with the stems pivoted to the first and second endless chains which are spaced apart in the forward and rearward directions.

Therefore, the tray is not rotated about horizontal shaft, but its bottom is held horizontal.

Further, when the first and second endless chains are synchronously driven in either forward or reverse direction by drive means, the tray is run about the horizontal shafts along an oval orbit. However, since the tray is held horizontal at all time, parts carried in the tray will never fall during the transport.

Now, a second embodiment of the invention, in which, unlike the first embodiment trays are guided by guide arms, will be described with reference to FIGS. 6 to 9.

Reference numeral 38 designates a tray having a channel-shaped front view consisting of a bottom 38a and side walls 38b and 38c provided along the opposite side edges of the bottom.

Figure 8:
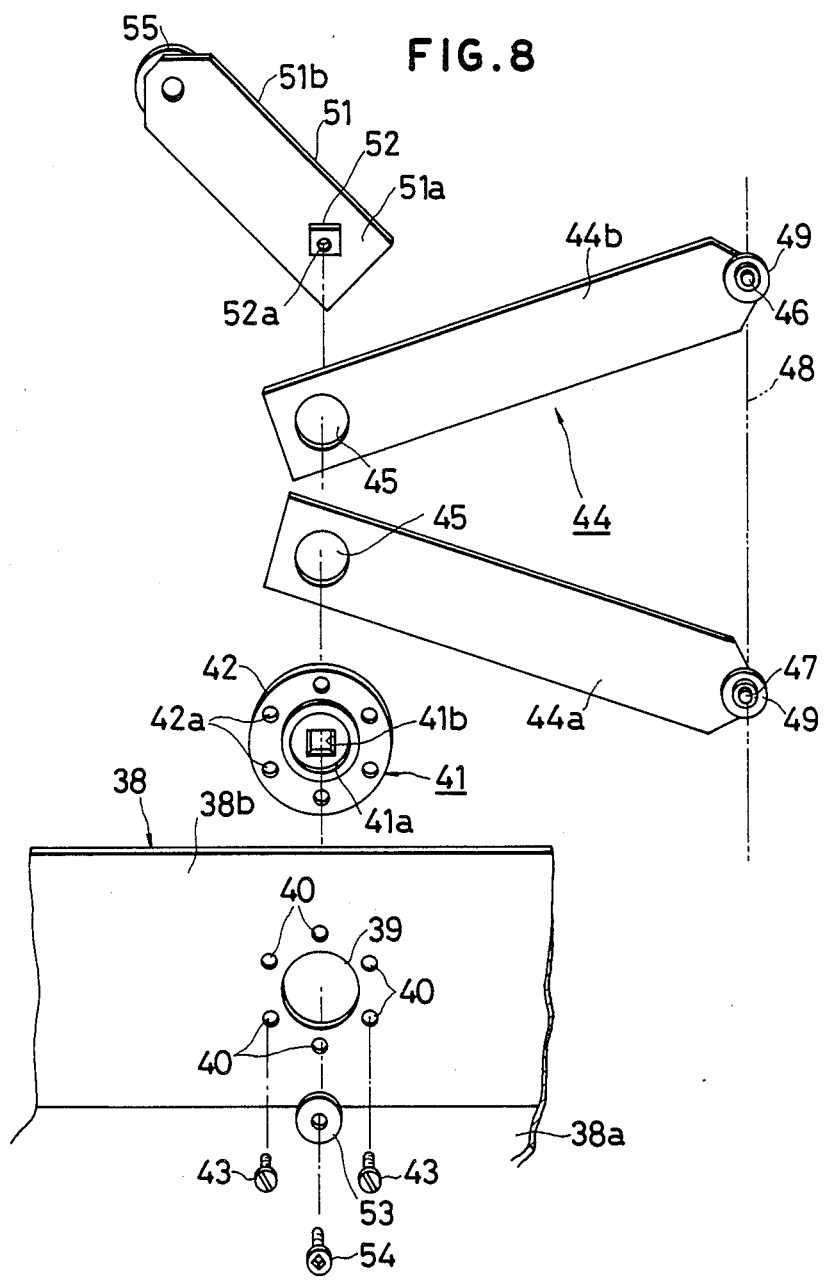
FIG. 8 is a perspective view, partly broken away, showing a tray support structure.

As shown in FIG. 8, a central portion of the left side wall 38b of the tray 38 in the forward and rearward directions when viewed from the take-out window, is formed with a circular hole 39 and six mounting holes 40 formed on a circle concentric with the circular hole 39.

Reference numeral 41 designates a connecting shaft, which has a recess 41a formed in one end and a cylindrical shaft portion 41c extending transversally from the bottom of the recess 41a and having a rectangular engagement hole 41b as anti-rotation hole. An outer flange 42 is provided on the outer periphery of the end of the cylindrical portion 41c. The flange 42 has six female threads 42a formed on a circle.

The connecting shaft 41 has an end fitted in a circular hole 39 formed in the side wall 38b of the tray 38 and is secured to the tray 38 by a set screw 43.

The free ends of two links 44a and 44b in a V-shaped sidewise arrangement constituting the support arm 44 are pivoted by their holes 45 on the shaft portion 41c of the connecting shaft 41.

Figure 7:
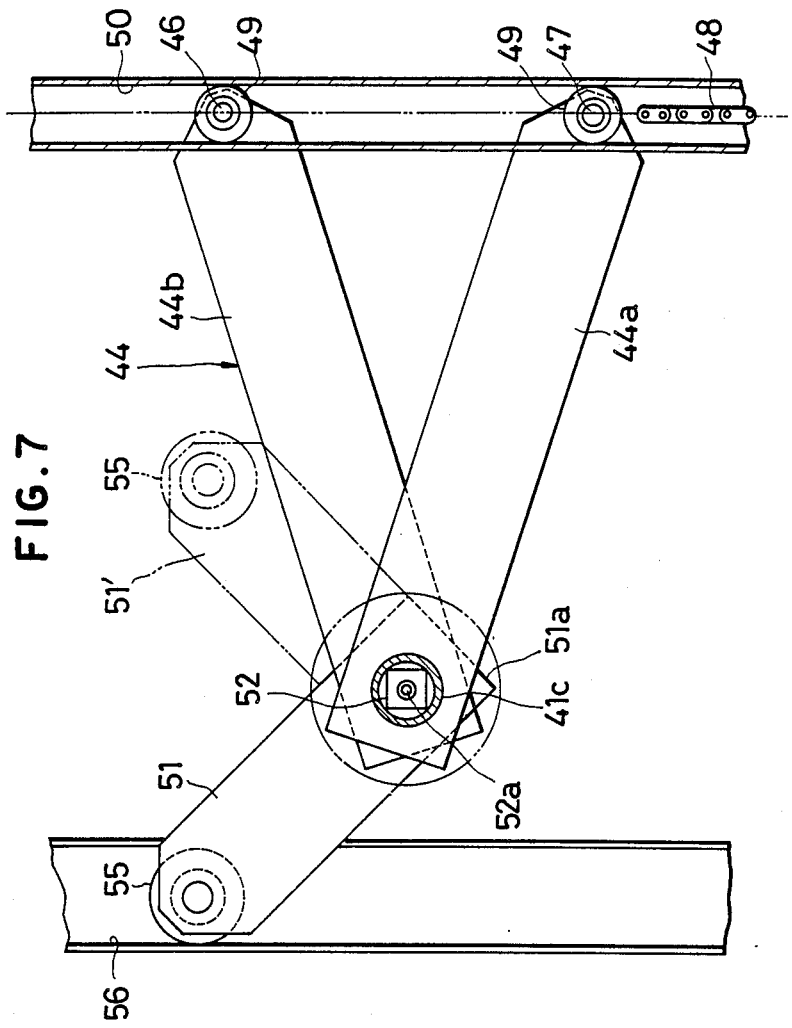
FIG. 7 is a sectional view taken along line VII—VII in FIG. 6.

The stems of the links 44a and 44b, as shown in FIG. 7, are pivoted by pins 46 and 47 to an endless chain 48, and are also guided by a pair of, i.e., left and right guide rails 50 consisting of groove members via rollers 49 pivoted at the opposite ends of the pins 46 and 47.

Reference numeral 51 designates a guide arm. One side surface 51a of a stem of the guide arm 51 is formed with a square projection 52 which has a female thread 52a. The projection 52 is fitted in the rectangular hole 41b of the connecting shaft 41 and is tightened by fitting a washer and set bolt 54 on it from the inner side of the tray 38. It is thus secured to the front side of the tray 38 with a forward upward inclination angle of 45 degrees.

A roller 55 rotatable about a horizontal axis is pivoted to the other side surface 51b of the free end of the guide arm 51. The roller 55 is adapted to be guided by a left side wall 56 which has a channel-shaped sectional profile.

The right side wall 38c of the tray 38 is also provided with connecting shaft 41, support arm 44 and guide arm 51' in a symmetrical fashion as viewed from the window, except for that only the guide arm 51' has a rearward upward inclination angle of 45 degrees with respect to the guide arm 51. The roller 55 is guided by a right side rail 57 having a channel-shaped sectional profile.

As shown in FIG. 9, an endless chain 48 for transporting trays 38 via support arms 44 is passed round pair, i.e., upper and lower, sprockets 59 and 60 provided in a hollow case 58. The lower sprocket is rotated via control means (not shown) consisting of a motor and a control unit.

The left side guide rail 56 consists of four groove members 56a to 56d arranged in two, i.e., front and rear, pairs such that they have a substantially oval side view free from upper front and lower rear corners.

More specifically, the lower end of the vertical front upper groove member 56a is continued via a seam gap 61 to the front lower groove member 56b which has an inversely J-shaped side view. The upper end of the short straight rear lower groove member 56c is continued via a seam gap 62 to the rear upper groove member 56d which has an inversely J-shaped view.

The right side guide rail 57 has four groove members 57a to 57d arranged in two, i.e., front and rear, pairs such that they have a substantially oval side view free from upper front and lower rear corners. This from of arrangement is line symmetrical with respect to the left side guide rail 56. The guide rail 57 is also disposed below the guide rail 56 by a distance corresponding to the gap between the front and rear rollers 55 for guiding the trays 38.

Further, the seam gap 61 of the left side guide rail 56 and the seam gap 62' of the right side guide rail 57 are vertically shifted in position with respect to the gap 62 of the left side guide rail 56 and the gap 61' of the right side guide rail 57, respectively. With this arrangement, both of the front and rear rollers 55 for guiding the tray 38 will not simultaneously pass through the gaps 61 and 62' and gaps 62 and 61'.

With the above structure of the second embodiment of the invention, each tray is guided by the left and right support arms with the stems thereof pivoted to the endless chain 48. Thus, the trays can be run more stably.

Further, since the guide arms are coupled to the tray via the connecting shafts pivotally supporting the free ends of the support arms, the assembly can be simplified.

Further, the positions of the seam gaps in the guide rails are vertically shifted between the left and right guide rails, even if the seam gaps are increased to stretch the endless chains taut, the rollers can pass reliably.

In the above embodiments, the individual excursion shelf units are controlled collectively by control means with a keyboard or the like. However, it is also possible to provide an operating section on a table or at an outlet for each unit so that each unit can be controlled independently.

Further, it is possible to permit parts to be accommodated in trays without use of any container supported in each tray.

Further, instead of chains with side rollers as endless chains for supporting trays, it is possible to construct chains by connecting links to one another and separate provide tray guide means.

Further, instead of supporting the tray in the first embodiment with the left and right support arms, a canti-lever structure may be employed, in which a support arm is provided on only the left or right side.

According to the invention, rows of trays which are driven to undergo excursion about the horizontal shafts are arranged side by side with respect to a table such that they can be driven independently, it is possible to reduce power for driving the trays.

Further, it is possible to increase the speed of search, and also it is possible to select a plurality of trays at a time.

What is claimed is:

1. A vertical excursion accommodation apparatus comprising a plurality of excursion shelf units disposed side by side and control means for driving said excursion shelf units independently, each of said excursion shelf units comprising:
    at least one tray;
    a first driven shaft and a first driving shaft disposed horizontally and parallel with respect to each other and having sprockets mounted thereon;
    a first endless chain passing around said sprockets;
    first and second arms for supporting each of said trays, said first support arm including a pair of first links, said first links having first ends pivotably coupled to said first endless chain, said first ends being spaced a distance apart in a vertical direction, said first links having free ends pivotably connected to a first pin on one side wall of said tray;
    a second driven shaft and a second driving shaft disposed horizontally and parallel with respect to each other and having sprockets mounted thereon;
    a second endless chain passing around said sprockets of said second driven and driving shafts;
    said second support arm including a pair of second links, said second links having first ends pivotably coupled to said second endless chain, said first ends of said second links being spaced a distance apart in a vertical direction, said second links having free ends pivotably connected to a second pin on the other side wall of said tray,
    said first pin is provided at a position on said one side wall and said second pin is provided at a position on said other side wall of said tray so that said tray will always be held horizontally;
    guide rails having an oval side view;
    guide arms, each of said trays having a first guide arm connected to said one side wall and a second guide arm connected to said other side wall, each of said guide arms having a free end thereof guided by one of said guide rails; and
    said control means for adjustably controlling said trays moving around said horizontal shafts along an oval orbit by rotating said sprockets.

2. The vertical excursion accommodation apparatus of claim 1 wherein each of said second driven and said second driving shafts are disposed a distance from said first driven and said first driving shafts, respectively.

3. The vertical excursion accommodation apparatus of claim 1 wherein each of said trays faces a pusher at a predetermined take-out position.

* * * * *